(12) United States Patent
Shrestha et al.

(10) Patent No.: US 12,010,467 B2
(45) Date of Patent: Jun. 11, 2024

(54) METHOD AND SYSTEM FOR WHOLE SLIDE IMAGING

(71) Applicant: KONINKLIJKE PHILIPS N.V., Eindhoven (NL)

(72) Inventors: Prarthana Shrestha, Eindhoven (NL); Jelte Peter Vink, Waalre (NL); Maarten Van Lierop, Rosmalen (NL); Gerardus Johannes Wilhelmus Van Den Braak, Eindhoven (NL); Mathijs Rem, Eindhoven (NL); Jeroen De Kleijn, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 96 days.

(21) Appl. No.: 17/790,291

(22) PCT Filed: Dec. 24, 2020

(86) PCT No.: PCT/EP2020/087847
§ 371 (c)(1),
(2) Date: Jun. 30, 2022

(87) PCT Pub. No.: WO2021/136740
PCT Pub. Date: Jul. 8, 2021

(65) Prior Publication Data
US 2023/0104460 A1  Apr. 6, 2023

(30) Foreign Application Priority Data

Dec. 31, 2019 (EP) ..................... 19220155

(51) Int. Cl.
*H04N 9/67* (2023.01)
*G02B 21/36* (2006.01)
*G06T 7/90* (2017.01)

(52) U.S. Cl.
CPC ............. *H04N 9/67* (2013.01); *G02B 21/365* (2013.01); *G06T 7/90* (2017.01);
(Continued)

(58) Field of Classification Search
CPC ... H04N 9/67; G06T 7/90; G06T 2207/10024; G06T 2207/10056; G06T 2207/30024; G02B 21/365
(Continued)

(56) References Cited

U.S. PATENT DOCUMENTS

| | | | |
|---|---|---|---|
| 6,560,358 B1 | 5/2003 | Tsukada | |
| 8,243,325 B2 * | 8/2012 | Eschbach | ............. H04N 1/6011 358/401 |

(Continued)

FOREIGN PATENT DOCUMENTS

| | | |
|---|---|---|
| CN | 102075666 A | 5/2011 |
| WO | WO2009039209 A1 | 3/2009 |

OTHER PUBLICATIONS

PCT International Search Report, International application No. PCT/EP2020/0878847, dated Mar. 12, 2021.
(Continued)

*Primary Examiner* — Trang U Tran
(74) *Attorney, Agent, or Firm* — Sherry Austin

(57) ABSTRACT

A method (and system) is provided obtaining an adapted calibration transformation for whole slide imaging, wherein the adapted calibration transformation is for outputting the color of an empty area of the slide in a whole slide image, WSI, as a desired color. The method comprises first receiving a color target WSI in a device-dependent color space, wherein the color target WSI is a WSI of a color target from a scanner represented in the device-dependent color space. The color target contains at least a white patch and three (near) primary color patches. A calibration transformation is (Continued)

obtained for transforming the device-dependent color space to a device-independent color space. A chromatic adaptation transformation is derived using the color of the white patch in the device-dependent color space, the color of the empty (glass) area in the device-independent color space and the desired empty (glass) color in the target color space. An adapted calibration transformation is obtained by applying the chromatic adaptation transformation to the calibration transformation.

14 Claims, 7 Drawing Sheets

(52) U.S. Cl.
CPC ............... *G06T 2207/10024* (2013.01); *G06T 2207/10056* (2013.01); *G06T 2207/30024* (2013.01)

(58) Field of Classification Search
USPC .......................................................... 348/79
See application file for complete search history.

(56) References Cited

U.S. PATENT DOCUMENTS

| | | | | |
|---|---|---|---|---|
| 8,797,589 | B2* | 8/2014 | Dalal | H04N 1/6033 |
| | | | | 358/1.9 |
| 9,797,767 | B2* | 10/2017 | Corwin | G01N 21/274 |
| 10,453,423 | B2* | 10/2019 | Nasiriavanaki | G09G 5/06 |
| 11,609,574 | B2* | 3/2023 | Walters | G05D 1/0225 |
| 11,721,225 | B2* | 8/2023 | Wang | G08G 5/0013 |
| | | | | 701/117 |
| 2004/0199346 | A1 | 10/2004 | Stokes | |
| 2004/0228525 | A1 | 11/2004 | Krabbenhoft | |
| 2007/0285684 | A1 | 12/2007 | Borg | |
| 2015/0124072 | A1 | 5/2015 | Wei | |
| 2016/0170197 | A1* | 6/2016 | Kenny | G01N 21/274 |
| | | | | 348/79 |

OTHER PUBLICATIONS

Pantanowitz L. et al., "Digital Images and the Future of Digital Pathology", Journal of Pathology Informatics, vol. 1, No. 15, 2010.
Krupinski E. A. et al., "Observer Performance Using Virtual Pathology Slides: Impact of LCD Color Reproduction Accuracy", Journal of Digital Imaging, vol. 25, No. 6, pp. 738-743, 2012.
Prarthana S. et al., "Color Accuracy and Reproducibility in Whole Slide Imaging Scanners", Journal of Medical Imaging, vol. 1, Issue 2, pp. 027501-1-027501-8, 2014.
ICC recommendation: ICC.1:2004-10 (available at: http://www.color.org/index.xalter).
Gavrielides M.A. et al., "Assessing Color Reproducibility of Whole-Slide Imaging Scanners", Proceeding of SPIE—The International Society for Optical Engineering, Mar. 2013.

* cited by examiner

METHOD AND SYSTEM FOR WHOLE SLIDE IMAGING

CROSS-REFERENCE TO RELATED APPLICATIONS

This patent application claims the priority benefit under 35 U.S.C. § 371 of International Patent Application no. PCT/EP2020/087847, filed Dec. 24, 2020, which claims the benefit of European Patent Application No. EP19220155.6, filed on Dec. 31, 2019. These applications are hereby incorporated by reference herein in their entirety.

FIELD OF THE INVENTION

The invention relates to methods and systems for improving calibration for whole slide imaging. In particular, the invention relates to adapting a calibration transformation to output the empty area of the slide in a whole slide image as a desired color.

BACKGROUND OF THE INVENTION

Pathology slides, containing stained samples of body tissue, may be examined under a microscope in order to analyze the sample and diagnose abnormalities. The variation in, and number of features of, different organs, anatomical sites and lesions means that classifying abnormalities from pathology slides is time-consuming work for physicians and requires a high level of experience in order to classify an abnormality accurately.

Digital pathology allows the pathology slides to be converted into digital slides that can be viewed and analyzed on a computer. Digital pathology scanners acquire the Whole Slide Images (WSI) of a pathology slide, aiming to provide an accurate and precise view of a slide content to the pathologists. Since the presence or absence of a color in a WSI has direct influence on the pathologists' performance and the reliability of the clinical diagnosis, the scanner reproduced colors should be accurate and consistent. Furthermore, the use of WSI in computational pathology increases the demand for stricter color fidelity in the images.

Different experiments have shown the improvement of color accuracy and consistency when using color calibration in digital pathology. However, the visually unpleasant effect introduced by the reference and sample mismatch, both in terms of intensity and color cast in white, lowers the usefulness of the calibration. There is an attempt to minimize the effect by adding empirical static gains in the system, but these may not be applicable to different systems and may increase variation among different systems.

The color calibration in digital pathology scanners aims for the best color reproduction (closest to the real sample colors) to the output devices (such as a display monitor) while reducing the inter-scanner variation. Ideally, a color target (e.g. color phantom) used as a reference in color calibration should match with the pathology slide characteristics. However, due to the absence of standardization, the targets used in digital pathology scanners are generic targets, for example film based IT8 targets. The physical differences between the calibration target and pathology slides may introduce a tinted white cast on the tissue images.

Therefore, there is a need for a method to provide a consistent and desired background color in whole slide imaging.

SUMMARY OF THE INVENTION

The invention is defined by the claims.

According to examples in accordance with an aspect of the invention, there is provided a method for obtaining an adapted calibration transformation for whole slide imaging, wherein the adapted calibration transformation is for outputting the color of an empty area of the slide in a whole slide image, WSI, obtained by a scanner as a desired color in a device-independent color space, the method comprising:

receiving a color target WSI in a device-dependent color space, wherein the color target WSI is a WSI of a color target from the scanner represented in the device-dependent color space and wherein the color target contains at least a white patch and three color patches;

obtaining a calibration transformation for transforming the device-dependent color space to the device-independent color space;

determining a chromatic adaptation transformation based on the color of the white patch in the device-dependent color space, the color of the empty area in the device-dependent color space and the desired color (i.e. the color of the empty area of the slide, i.e. of the slide glass) in the target color space; and obtaining an adapted calibration transformation based on applying the chromatic adaptation transformation to the calibration transformation.

Whole slide images show the background color of the empty area (e.g. where there is no tissue) but due to variations in RGB sensors, light sources and operating conditions, the background color may appear different in different scanners. Whole slide images are typically processed onto a standard color space, mainly for a display to be able to accurately display the images. The processing typically involves transforming the WSI with a mapping matrix or a lookup-table, obtained as a result of the scanner color-calibration, which transforms the scanner dependent WSI to a device-independent color space, which can be further transformed to an output device color space such as a display sRGB. However, such transformations typically used in digital pathology do not reproduce a desired and consistent background color, in particular the empty area of the slide.

In accordance with the invention, in order to adapt the background color, a chromatic adaptation transformation is determined based on the color of an (glass) empty area of the slide and a desired color. The (final) chromatic adaptation transformation transforms the white point from the scanner to an optimal white point, wherein the optimal white point results from tuning the transformed color of the empty area of the slide, i.e. the glass area.

The chromatic adaptation transformation is applied to the calibration transformation to obtain an adapted calibration transformation. The adapted calibration transformation can then be applied to any WSI, and the output image will have the background color (empty slide area) represented as the desired color in the device-independent color space.

For the avoidance of doubt, by "device-dependent color space" is meant the color space used by the scanner, unless mentioned otherwise. A "device-independent color space" is intended to refer to a color space which is independent of the scanner and independent of any output device. This device-independent color space may be a color space (such as XYZ) not typically used as an output color space.

In this document, whenever there is reference to a color of a feature (such as the color of the white patch or the color of the glass area) this refers to the color in the particular color space currently under discussion.

The color target for example includes three color patches which are primary colors, or near to primary colors. Obtaining a calibration transformation may then be based on calibrating a scanner by mapping a set of scanner acquired raw RGB values from the color target with a set of reference colorimetric values and obtaining a transformation function.

The target color space may be the same color space as the device-independent color space or it may instead be a different, output device-dependent (such as display sRGB), color space. However, the device-independent color spaces are typically used in intermediate color transformations and do not tend to be visually intuitive. Therefore, the desired color is preferably defined in an output device-dependent color space. For example, the neutral white in display color white is defined as R=G=B.

Determining a chromatic adaptation transformation may then comprise:

applying the adapted calibration transformation to the color of the empty area in the device-dependent color space;

applying a further transformation to the color of the empty area to the target color space;

determining a color difference between the empty area color and the desired color, both in the same target color space; and modifying a white point in the device-independent color space iteratively to obtain an adapted white point in the device-independent color space such that the adapted calibration transformation results in the minimum color difference.

Although the desired color is defined in a target color space, the chromatic adaptation method makes use of an input and output white point in the device-independent color space. This is because the techniques used in the computation of the chromatic adaptation transformation, such as a chromatic adapation matrix, e.g. as Bradford, Von Kries and XYZ scaling, are designed in the device-independent color space. Thus, the adaption of the chromatic adaptation matrix takes place in the device-independent color space.

Modifying the scanner white point for example comprises determining a chromatic adaptation matrix, given the white point in the device-independent color space as a source white point and an adapted scanner white point as a destination white point.

A final (optimal) scanner white point may not be able to be intuitively defined in the device-independent color space, as mentioned above. Thus, rather than being pre-determined, the optimization process results in the optimal scanner white point based on processing of the actual and desired color of an empty (glass) area of the slide in the target color space. This target color space can be intuitive and visualized on, for example, a display or a printer.

The device-independent color space may be one of:
the XYZ color space; or
the Lab color space.

The target color space for example comprises a linear color space, and may comprise one of:
the sRGB color space;
the SWOP CMYK color space;
the Adobe RGB color space; and
the ProPhoto RGB color space.

Determining a chromatic adaptation transformation may be based on one or more of:
the XYZ scaling method;
the Bradford method; or
the Von Kries method.

The desired color may be neutral white and the target color space may be the sRGB color space, wherein neutral white is defined as R=G=B in the sRGB color space.

The invention also provides a computer program comprising code means for implementing any one of the methods mentioned above when said program is run on a processing system.

The invention also provides a system for obtaining an adapted calibration transformation for whole slide imaging, wherein the adapted calibration transformation is for outputting the color of an empty area of the slide in a whole slide image, WSI, obtained by a scanner as a desired color in a device-independent color space, the system comprising:

a scanner for obtaining a WSI in a device-dependent color space;

a processor configured to:

receive a color target WSI in a device-dependent color space, wherein the color target WSI is a WSI of a color target from the scanner represented in the device-dependent color space and wherein the color target contains at least a white patch;

obtain a calibration transformation for transforming the device-dependent color space to a device-independent color space;

determine a chromatic adaptation transformation based on the color of the white patch in the device-dependent color space, the color of the empty area in the device-dependent color space and the desired color in the target color space; and obtain an adapted calibration transformation based on applying the chromatic adaptation transformation to the calibration transformation.

The device-independent color space for example comprises:
the XYZ color space; or
the Lab color space.

The color target for example consists of at least one white patch and at least three color patches, and comprises:
an IT 8.7/1 color target;
a Macbeth color checker;
a Sierra color target;
a Chromacal color target; or
a MGH color target.

The processor is for example adapted to determine a chromatic adaptation transformation by:

applying the adapted calibration transformation to the color of the empty area in the device-dependent color space;

applying a further transformation to the color of the empty area to the target color space;

determining a color difference between the empty area in the target color space and the desired color; and modifying the white point in the device-independent color space iteratively to obtain an adapted scanner white point in the device-independent color space such that the adapted calibration transformation results in the minimum color difference.

Modifying the scanner white point may comprise determining a chromatic adaptation matrix, given the white point in the device-independent color space as a source white point and an optimal scanner white point as a destination white point.

The target color space for example comprises a linear color space, and comprises one of:
the sRGB color space;
the SWOP CMYK color space;
the Adobe RGB color space; and
the ProPhoto RGB color space.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
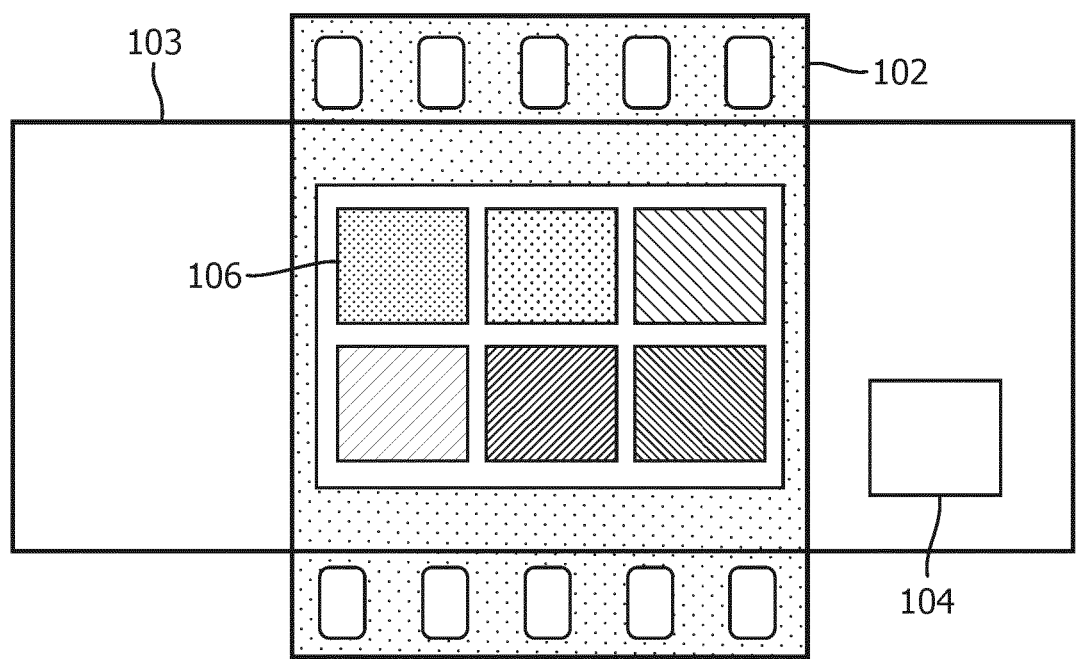
FIG. 1 shows an example of a color target in a slide for whole slide imaging.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method (and system) for obtaining an adapted calibration transformation for whole slide imaging, wherein the adapted calibration transformation is for outputting the color of an empty area of the slide in a whole slide image, WSI, as a desired color. The method comprises first receiving a color target WSI in a device-dependent color space, wherein the color target WSI is a WSI of a color target from a scanner represented in the device-dependent color space. The color target contains at least a white patch and three (near) primary color patches. A calibration transformation is obtained for transforming the device-dependent color space to a device-independent color space. A chromatic adaptation transformation is derived using the color of the white patch in the device-independent color space, the color of the empty (glass) area in the target color space and the desired empty color in the target color space. An adapted calibration transformation is obtained by applying the chromatic adaptation transformation to the calibration transformation.

The use of color in this document refers to coordinates in a color space which make up the specified color. For example, the RGB color model may be used to refer to a color in three dimensions and the color space may be one of sRGB, Adobe RGB, ProPhoto RGB, scRGB, CIE RGB etc. The RGBA or the CMYK color models may also be used.

FIG. 1 shows an example of a color target 102 in a slide 103 for whole slide imaging. Due to the lack of color standardization in digital pathology, a generic color workflow as recommended by the International Color Consortium (ICC) is typically followed by scanner manufacturers and/or users. The workflow facilitates transforming the raw scanner colors, acquired on a device-dependent color space (e.g. RGB), to a device-independent color space (e.g. XYZ or LAB color space), such that output devices (e.g. a LCD display or a printer) can represent the scanner acquired colors, without losing information. The transformation function may be derived during color calibration by mapping the scanner acquired raw RGB values of different color patches in a color target 102, to the reference colorimetric values of the patches. Some examples of color phantoms 102 used in microscopy and digital pathology are an IT 8.7/1 color target, a Macbeth color checker, Chromacal color target, Sierra color target or a MGH color target.

The color targets (or phantoms) 102 are imported from the field of film-based analog cameras, flat-bed scanners or optical filters and therefore the samples are not fully representative for microscopy in general and digital pathology in particular. The film based IT8 and Macbeth color checker, the most commonly used color targets 102 in digital pathology, are in total about 0.1 mm thick while a pathology slide 103 is about 0.002 mm-0.006 mm thick. Consequently, the color targets 102 transmit less light than a pathology slide. Similarly, the Chromacal and MGH color targets 102 are based on a chip and stained polymer films, respectively, mainly used in optical filters. The color target 102 shown in FIG. 1 is an example of a film color target 102 on a pathology slide 103. The film color targets 102 can be wider than the pathology slide 103 as is shown in FIG. 1.

The mismatch in both the substrate and colors between the color of a pathology slide and the calibration target 103 results in a calibration matrix that produces an un-natural effect, such that upon calibrating a raw image it appears to have a color-cast.

Figure 2:
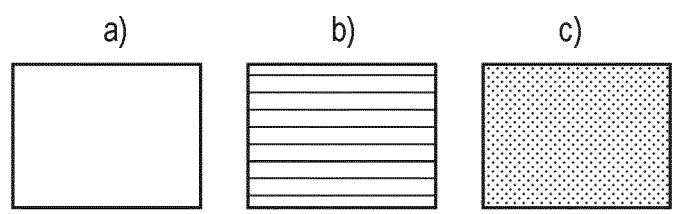
FIG. 2 shows an exaggerated illustration of the difference between raw scanner acquisitions and the scanner outputs after calibration.

FIG. 2 shows an exaggerated illustration of the difference between raw scanner acquisitions and the scanner outputs after calibration.

FIG. 2a shows a reference colorimetric value.

FIG. 2b shows a raw scanner acquisition of color target 102.

FIG. 2c shows a scanner output of color target 102 after calibration.

FIG. 2 for example schematically shows the sRGB color space representation of the IT8 white patch (labeled as GS0) according to its reference colorimetric value, the raw scanner acquisition and the scanner output after calibration. The color of FIG. 2b, before calibration, and FIG. 2c, after calibration, show a tainted white. When the same calibration is applied to the empty slide area 104, it appears to have yet another strong cast, resulting in an unnatural background of tissue images.

Figure 3:
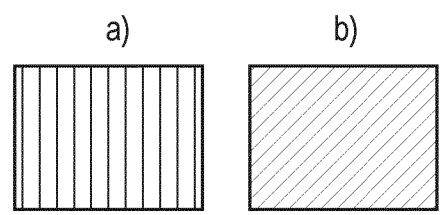
FIG. 3 shows an exaggerated illustration of the empty slide area and after calibration.

FIG. 3 shows an exaggerated illustration of the empty slide area 104 before and after calibration.

FIG. 3a shows a raw scanner acquisition of the empty slide area 104.

FIG. 3b shows a scanner output of the empty slide area 104 after calibration.

FIG. 3 for example schematically shows the sRGB representation of an empty slide area 104 as a raw scanner acquisition and after calibration. By way of example, the FIG. 3a may represent mean RGB values [0.74, 0.74, 0.72] whereas FIG. 3b represents mean RGB values [0.68, 0.75, 0.72]. This schematically shows that the calibration transformation obtained from the color targets 102 and reference values does not represent the empty slide area 104 in a desired (neutral white) color.

Therefore, the calibration transformation must be adapted such that when it is applied to a whole slide image, the empty glass area 104 in particular becomes a desired color, such as neutral white (R=G=B), with a desired intensity, while maintaining the object color (e.g. tissue).

Figure 4A:
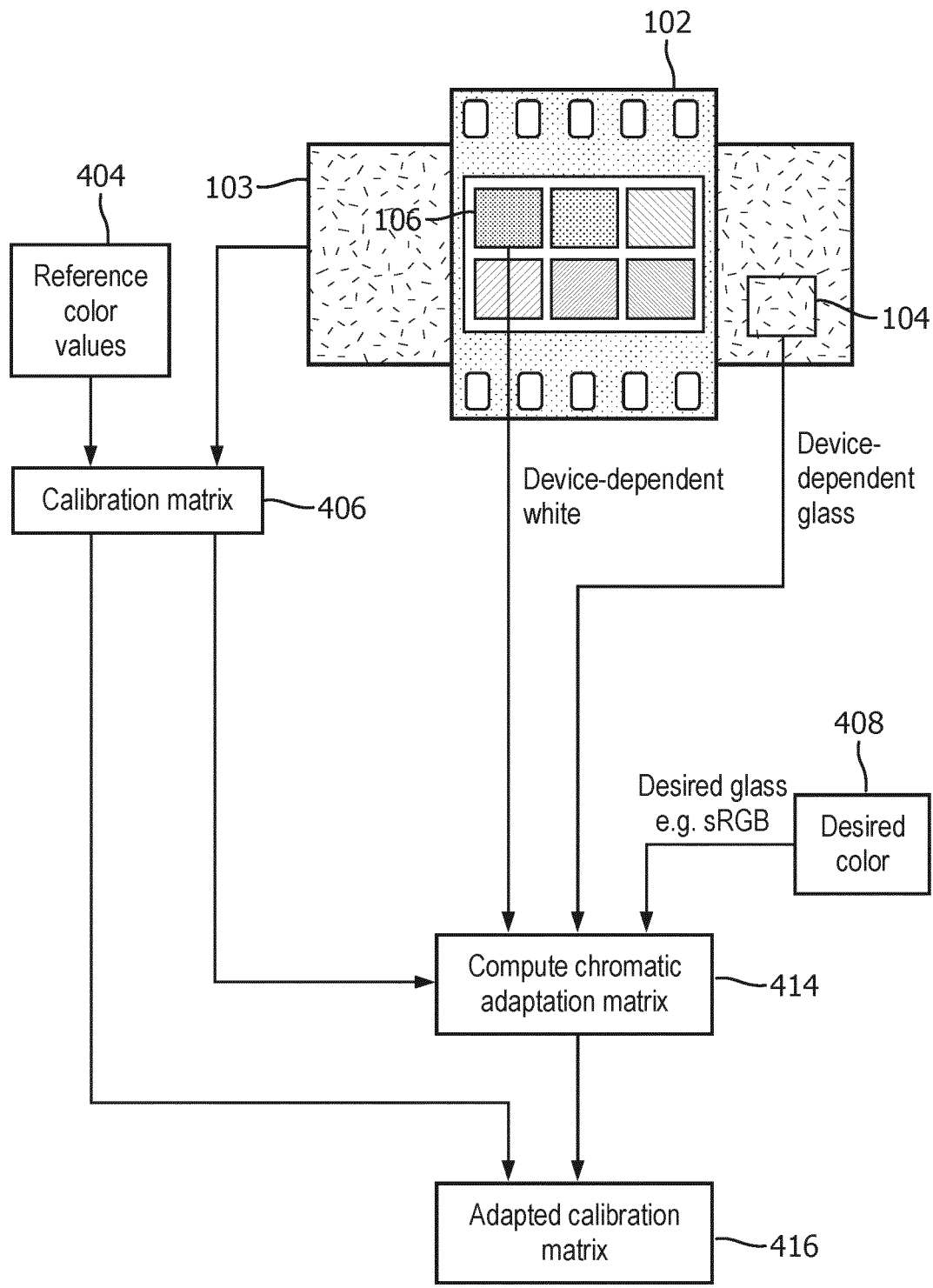
FIG. 4a shows a schematic representation of a method for obtaining an adapted calibration transformation.

FIG. 4a shows a schematic representation of a method for obtaining an adapted calibration transformation 416. The following examples assume the transformations to be matrices, however matrices are not necessary and it will be known to the person skilled in the art that there are other ways of performing the transformations (e.g. look-up tables, TRC-matrix transformations).

A first step is to perform the conventional color calibration.

Given the raw RGB patch colors 106 of the color target 102 captured by a scanner, and the reference colorimetric values 404 of the patches (in XYZ or Lab colorspace), a calibration matrix 406, for example of size 3×3, is computed by minimizing the color difference between the transformed RGB colors 106 and the reference colorimetric values 404. A matrix-based calibration is typically adopted due to its superior perceptual quality in pathology slide images. However, the invention applies to any calibration transformation.

The invention then applies a chromatic adaptation to the calibration transformation, e.g. calibration matrix 406.

The determination of a chromatic adaptation matrix (or other function more generally) is shown as step 414.

It receives as one input the native scanner white, i.e. the color of the target white patch 106 in the device-dependent color space. This is termed "Device-dependent white" in FIG. 4a. A scanner white point in the device-independent color space may be derived from this device-dependent white by applying the eventually adapted calibration matrix to the color target white patch 106.

The term "white point" is generally used to refer to the representation of white in the device-independent color space, whereas the term "scanner white" refers the color of the white patch as represented in the scanner color space.

Another input is the empty slide color 104 in the device-dependent color space (termed "Device-dependent glass" in FIG. 4a).

Another input is the desired color 408 for the glass area in a target color space.

Another input is the calibration matrix 406.

The determination of the chromatic adaptation matrix is for example an iterative minimization process, explained in detail below. The resulting chromatic adaptation matrix is applied to the calibration matrix to derive the adapted calibration matrix 416.

This adapted calibration matrix may then be used to transform from the device-dependent color space to the device-independent color space, with the empty glass area transformed to a color in the device-independent color space which corresponds to the desired color 408 in the target color space.

In this example, the device-dependent color space is RGB, the device-independent color space is XYZ, and the target color space is sRGB. The desired color 408 in the target sRGB color space may for example be set to be R=G=B and at 85% for a comfortable viewing brightness level and avoiding intensity clipping, in case the tissue content happens to be somewhat brighter than the glass area.

Figure 4B:
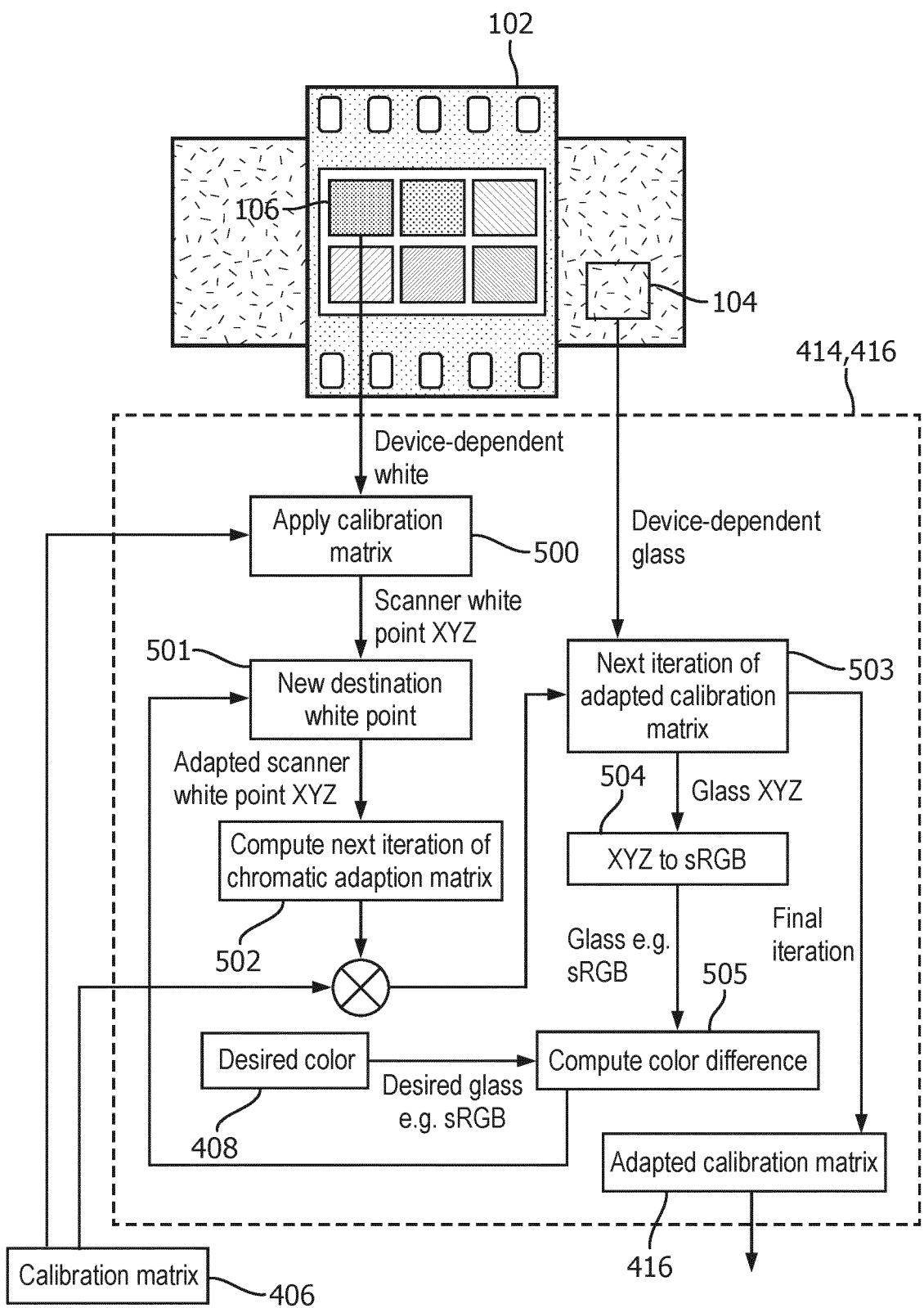
FIG. 4b shows in more detail the process of computing the chromatic adaptation matrix.

FIG. 4b shows the steps in determining the chromatic adaptation matrix and the resulting adapted calibration matrix in more detail. It shows the steps 414 and 416 of FIG. 4a in more detail.

The process in this example is an iterative process which is implemented as a minimization problem. It generates the chromatic adaptation matrix as a series of iterative adjustments, with the aim of minimizing a color difference in the target color space between the desired color 408 for the empty glass area and the actual empty glass color (in the target color space) as obtained by the adapted calibration matrix.

The target color space may be the device-independent color space. In such a case, the desired color is set in the XYZ color space. For example, a desired color in the color-independent color space (XYZ) could be selected or even derived using an inverse transformation from a display color space.

FIGS. 4a and 4b however show a preferred implementation in which the target color space is a color space used by an output device, to enable a more intuitive setting of the desired color.

For example, the XYZ device-independent color space is used in color transformations so is not visually intuitive. The desired color is thus preferably defined in the target color space, such as sRGB, where neutral white is defined as R=G=B.

However, the chromatic adaptation method is performed in the device-independent color space rather than in the target color space. It makes use of a transformation between input and output white points in the device-independent color space. Thus, it may be considered to be a modification of the white point (i.e. in the device-independent color space).

The native scanner white ("device-dependent white") is converted to the scanner white point (shown as "Scanner white point XYZ") in the device-independent color space in step 500 by using the calibration matrix 406.

The calibration matrix is applied only once to the scanned color target. As described below, the process finds a transformation (e.g. matrix) which adapts the scanner white point. A corresponding transformation is then applied to the calibration matrix. At the end of the process, this adapted scanner white point may be considered to be an optimal scanner white point in the device-independent color space, and it corresponds to a mapping from the device-dependent color space to the device-independent color space which results in the empty glass area having the desired color.

The scanner white point is adapted to a new scanner white point in step 501 as a series of iterations. At each iteration, a next iteration of the resulting chromatic adaptation matrix is calculated in step 502. It is applied to the calibration matrix 406 to derive a next iteration of the adapted calibration matrix 503.

This next iteration of the adapted calibration matrix is applied to the scanned empty glass area 104 in the device-dependent color space (RGB in this example) (shown as "Device-dependent glass" in FIG. 4b) to obtain the glass color in the device-independent color space (shown as "Glass XYZ" in FIG. 4b).

A transformation 503 from the device-independent color space (XYZ) is then performed to derive the glass color in the target color space (sRGB in this example). A color difference with the desired color 408 in the same target color space is then performed in step 505 to give an error value.

This color error is for example calculated using the known DeltaE or Eucledian methods for color differences between the RGB (or XYZ) co-ordinates.

This error value is used to adjust the calculation of the chromatic adaptation matrix in a next iteration. Thus, the error value is provided for use in the next iteration. For this repeated iterative process, the method returns to step 501.

The iterative processing of steps 501 and 502 involves determining a chromatic adaptation matrix, given the white point in the device-independent color space as a source white point and an adapted scanner white point as a destination white point. When the iterations have been completed, the adapted white point set in step 501 will correspond with the optimal scanner white point, which is the scanner white point which results in the desired glass color in the target color space.

The setting of the destination white point in step 501 for example may be implemented using the Nelder-Mead (downhill simplex) approach, which is a numerical method used in finding the minimum or maximum of an objective function. The method can repeat until it meets a predefined constraint(s) such as: maximum number of iterations, maximum number of function evaluations, and tolerance on the difference between two consecutive function values.

Eventually, the chromatic adaptation matrix is obtained such that the optimal scanner white point in the device-independent color space is reached, corresponding to the desired color of the glass area in the target color space.

The final iteration of the adapted calibration matrix 416 is output.

The error signal may be considered to correspond to the error from an optimal scanner white point, in that the iterations conclude when the adapted scanner white point is optimal. Thus, the adapted calibration matrix is computed based on the chromatic adaptation matrix transforming the native scanner white point of the scanner to an optimal scanner white point. Thus, the process optimizes how the native scanner white point is processed.

It can be seen from FIG. 4b that the adapted calibration matrix 416 translates to the device-independent color space. By applying an appropriate transformation from the device-independent color space to a desired target color space, the same adapted calibration matrix may be used for different output devices, i.e. different target color spaces.

The obtained adapted calibration matrix may thus be applied to WSI images from a particular scanner with a particular slide format in order to achieve a desired glass area output color in a device-independent color space. A user may then apply a further transformation to map to their desired target color space. Thus, the obtained adapted calibration matrix may be combined with a further transformation to enable translation directly from the device-dependent (scanner) color space to the desired target (e.g. output device) color space.

A Gamma transformation may be applied to the WSI in the output device, e.g. display, color space before the display displays the WSI. A transformation from the linear target space to a desired output color space such as sRGB may also be performed.

Thus, the process of deriving the adapted calibration matrix is a calibration process which prepares one particular scanner type and slide type to be able to generate images with a known and desired output color of the empty glass area.

Figure 5:
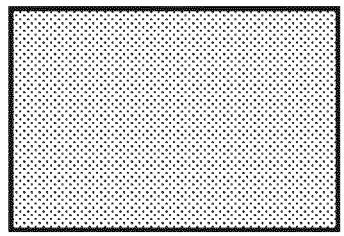
FIG. 5 shows an exaggerated illustration of the empty slide area 104 before and after being calibrated with an adapted calibration transformation.
Figure 5:
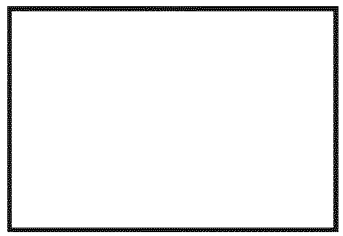

FIG. 5 shows an exaggerated illustration of the empty slide area 104 before and after being calibrated with an adapted calibration transformation 416.

FIG. 5a shows raw scanner acquisition of empty glass area 104.

FIG. 5b shows a scanner output of empty glass area 104 after calibration with an adapted calibration matrix 416.

FIG. 5 schematically shows the sRGB representation of an empty glass area 104 as a raw scanner image and after applying the adapted calibration matrix 416. FIG. 5a for example schematically represents RGB co-ordinates [0.74, 0.74, 0.72] and FIG. 5b represents mean RGB co-ordinates [0.85, 0.85, 0.85], which corresponds to a desired color 408 used in optimization. This simply represents an example of possible color change.

FIG. 6 shows the distribution of color target patches in a chromaticity diagram.

Figure 6A:
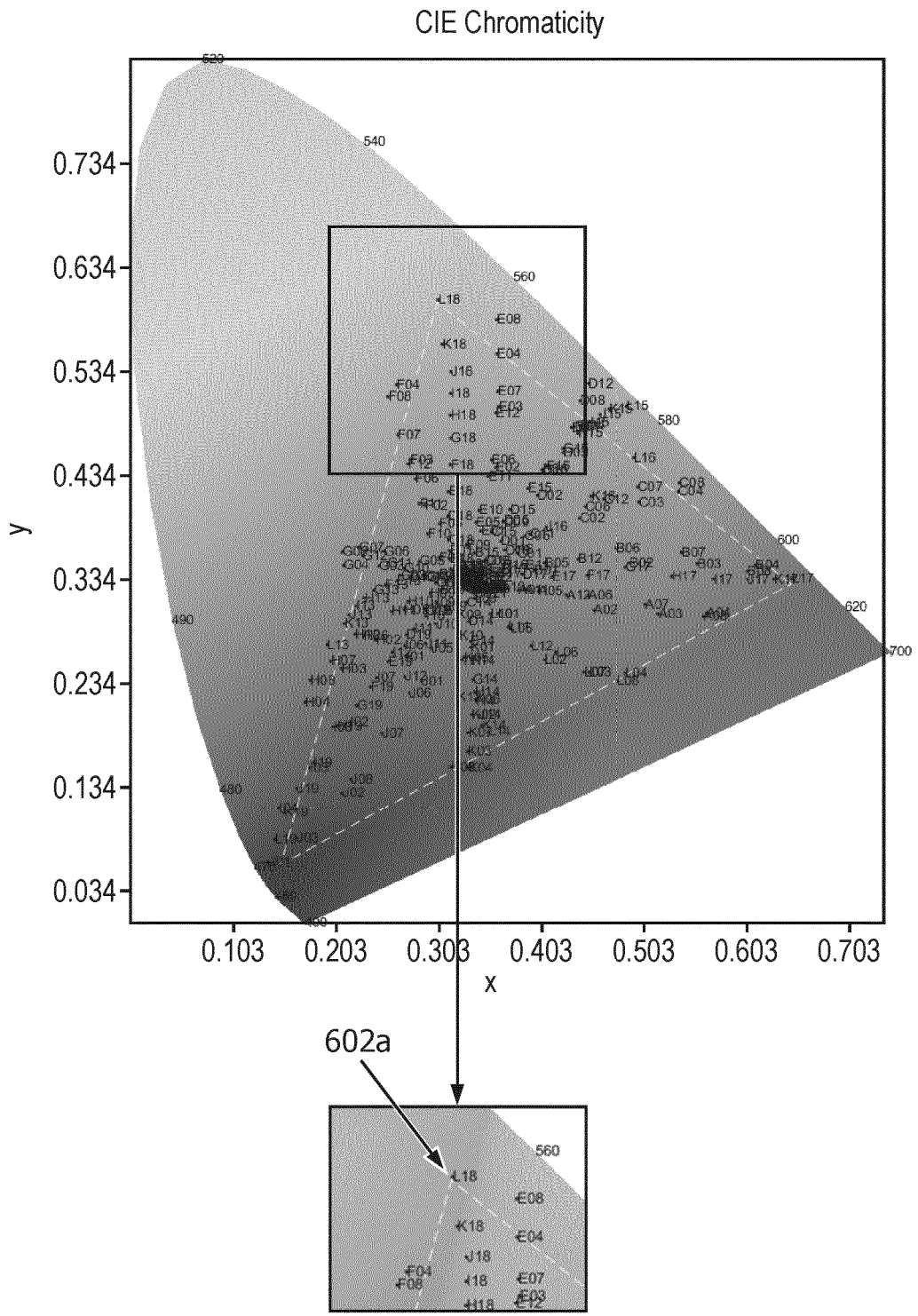
FIG. 6 shows the distribution of color target patches in a chromaticity diagram.

FIG. 6a shows raw patches after applying calibration matrix 406.

Figure 6B:
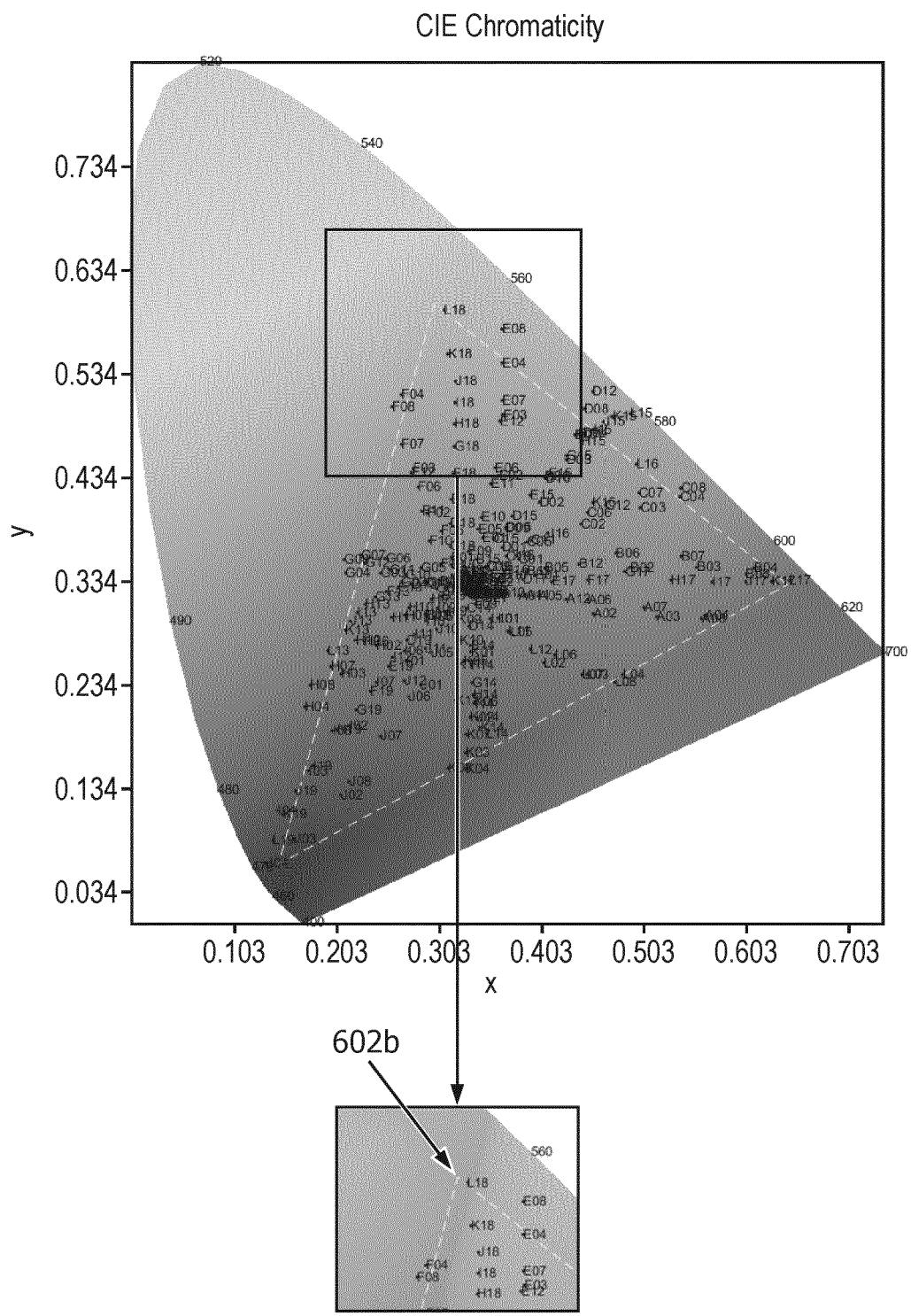

FIG. 6b shows raw patches after applying the adapted calibration matrix 416.

A color target patch is given by a black dot with a label name. The triangle shown in white dotted lines represents the sRGB color space. FIG. 6 shows the distribution of IT8 color target patches, in the chromaticity plot, acquired by a scanner after applying only the calibration matrix 406 in FIG. 6a and after applying the adapted calibration matrix 416 in FIG. 6b. It shows that there is a slight shift in the overall color distribution. For example the patch L18 602a appear to be on the upper corner of the sRGB triangle in FIG. 6a, while the patch 602b is shifted slightly lower and to the right in FIG. 6b. However, the coverage of the patches in the sRGB color space is comparable in both of the transformations. It shows that the chromatic adaption of the calibration matrix 406 does not limit the reproduction of colors in sRGB color space.

Figure 7:
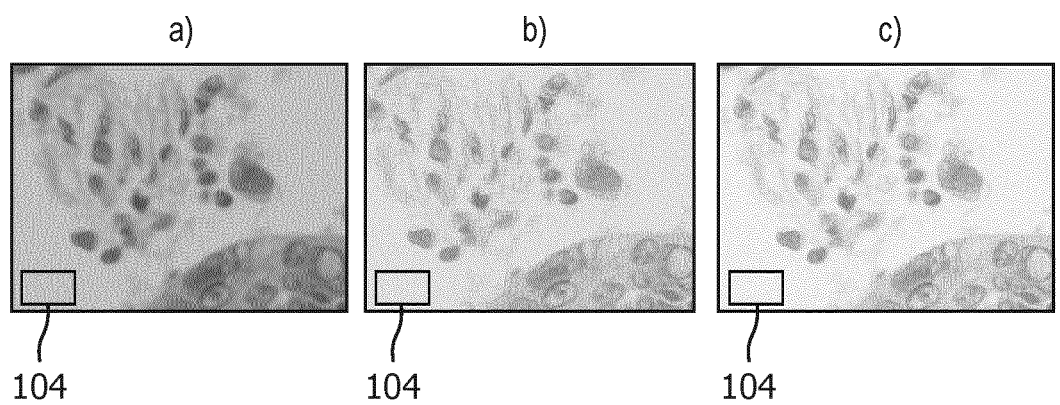
FIG. 7 shows an area of a whole slide image before and after calibrating.

FIG. 7 shows an area of a whole slide image before and after calibrating.

FIG. 7a shows raw scanner acquisition of the WSI.

FIG. 7b shows the scanner output after applying the calibration matrix 406 to the WSI.

FIG. 7c shows the scanner output after applying the adapted calibration matrix 416 to the WSI.

The empty slide area 104 appears to become a neutral white in FIG. 7c and appears more natural and offers higher visual contrast when compared with FIG. 7b. FIG. 7 shows a cropped area of the WSI, where different shades of empty slide areas 104 can be seen in an un-calibrated raw image of FIG. 7a and in the image calibrated using a calibration matrix 406 only in FIG. 7b. The same raw image, calibrated using the adapted calibration matrix 416 in FIG. 7c, shows a neutral white background as specified by the desired color 408.

The adapted calibration matrix for example enables a scanner with multiple cameras (e.g. high resolution and low resolution) to generate the same output colors (in particular background glass color) in the target color space. A low-resolution camera may for example be used in tissue detection and a high-resolution camera may be used in tissue scanning.

A system in accordance with the invention for obtaining an adapted calibration transformation combines a scanner for obtaining a WSI in the device-dependent color space and a processor to perform the processing steps described above.

The skilled person would be readily capable of developing a processor for carrying out any herein described method. Thus, each step of the flow charts of FIGS. 4a and 4b may represent a different action performed by a processor, and may be performed by a respective module of the processing processor.

The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for obtaining an adapted calibration transformation for whole slide imaging, wherein the adapted calibration transformation is for outputting the color of an empty area of the slide in a whole slide image, WSI, obtained by a scanner as a desired color in a device-independent color space, the method comprising:
   receiving a color target WSI in a device-dependent color space, wherein the color target WSI is a WSI of a color target from the scanner represented in the device-dependent color space and wherein the color target contains at least a white patch and three color patches;
   obtaining a calibration transformation for transforming the device-dependent color space to the device-independent color space;
   determining a chromatic adaptation transformation based on the color of the white patch in the device-dependent color space, the color of the empty area in the device-dependent color space and the desired color in a target color space; and
   obtaining an adapted calibration transformation based on applying the chromatic adaptation transformation to the calibration transformation; wherein obtaining a calibration transformation is based on calibrating the scanner by mapping a set of scanner acquired raw RGB values from the color target with a set of reference colorimetric values and obtaining a calibration transformation.

2. The method as claimed in claim 1, wherein the device-independent color space comprises:
   the XYZ color space; or
   the Lab color space.

3. The method as claimed in claim 1, wherein the color target consists of at least one white patch and at least three color patches, wherein a color patch includes
   an IT 8.7/1 color target,
   a Macbeth color checker,
   a Sierra color target,
   a Chromacal color target, or
   a MGH color target.

4. The method as claimed in claims 1 to 3, wherein determining a chromatic adaptation transformation comprises:
   applying the adapted calibration transformation to the color of the empty area in the device-dependent color space;
   applying a further transformation to the color of the empty area to the target color space;
   determining a color difference between the empty area in the target color space and the desired color in the target color space; and
   modifying a white point in the device-independent color space iteratively to obtain an adapted white point in the device-independent color space such that the adapted calibration transformation results in the minimum color difference.

5. The method as claimed in claim 4, wherein modifying the scanner white point comprises determining a chromatic adaptation matrix, given the white point in the device-independent color space as a source white point and an adapted scanner white point as a destination white point.

6. The method as claimed in claim 1, wherein the target color space comprises a linear color space, and comprises:
   the sRGB color space;
   the SWOP CMYK color space;
   the Adobe RGB color space; or
   the ProPhoto RGB color space.

7. The method as claimed in claim 1, wherein determining a chromatic adaptation transformation is based on one or more of:
   the XYZ scaling method;
   the Bradford method; and
   the Von Kries method.

8. The method as claimed in claim 1, wherein the desired color is neutral white and the target color space is the linear sRGB color space.

9. A non-transitory computer readable medium comprising code means for implementing the method of claim 1 when said program is run on a processing system.

10. A system for obtaining an adapted calibration transformation for whole slide imaging, wherein the adapted calibration transformation is for outputting the color of an empty area of the slide in a whole slide image WSI obtained by a scanner as a desired color in a device-independent color space, the system comprising:
    a scanner for obtaining a WSI in a device-dependent color space;

a processor configured to:
  receive a color target WSI in a device-dependent color space, wherein the color target WSI is a WSI of a color target from the scanner represented in the device-dependent color space and wherein the color target contains at least a white patch and three color patches;
  obtain a calibration transformation for transforming the device-dependent color space to a device-independent color space based on calibrating the scanner by mapping a set of scanner acquired raw RGB values from the color target with a set of reference colorimetric values to obtaining the calibration transformation;
  determine a chromatic adaptation transformation based on the color of the white patch in the device-dependent color space, the color of the empty area in the device-dependent color space and the desired color in a target color space; and
  obtain an adapted calibration transformation based on applying the chromatic adaptation transformation to the calibration transformation.

11. The system as claimed in claim 10, wherein the device-independent color space comprises:
  the XYZ color space; or
  the Lab color space,
  and wherein the color target consists of at least one white patch and at least three color patches, and comprises:
  an IT 8.7/1 color target;
  a Macbeth color checker;
  a Sierra color target;
  a Chromacal color target; or
  a MGH color target.

12. The system as claimed in claim 10, wherein the processor is adapted to determine a chromatic adaptation transformation by:
  applying the adapted calibration transformation to the color of the empty area in the device-dependent color space;
  applying a further transformation to the color of the empty area to the target color space;
  determining a color difference between the empty area in the target color space and the desired color; and
  modifying a white point in the device-independent color space iteratively to obtain an adapted white point in the device-independent color space such that the adapted calibration transformation results in the minimum color difference.

13. The method as claimed in claim 12, wherein modifying the scanner white point comprises determining a chromatic adaptation matrix, given the white point in the device-independent color space as a source white point and an adapted scanner white point as a destination white point.

14. The system as claimed in claim 11, wherein the target color space comprises a linear color space, and comprises:
  the sRGB color space;
  the SWOP CMYK color space;
  the Adobe RGB color space; or
  the ProPhoto RGB color space.

* * * * *